May 5, 1942. E. R. POWELL Re. 22,090

PROCESS OF MAKING FELTED MINERAL FIBER

Original Filed Aug. 24, 1928

INVENTOR.
EDWARD R. POWELL

BY Nigel C. Kline
ATTORNEY

Reissued May 5, 1942 Re. 22,090

UNITED STATES PATENT OFFICE 22,090

PROCESS OF MAKING FELTED MINERAL FIBER

Edward R. Powell, North Plainfield, N. J., assignor, by mesne assignments, to Johns-Manville Corporation, New York, N. Y., a corporation of New York Original No. 1,899,056, dated February 28, 1933, Serial No. 301,850, August 24, 1928. Reissue No. 19,627, dated June 25, 1935, Serial No. 8,511, February 27, 1935. This application for reissue May 10, 1941, Serial No. 392,987

15 Claims. (Cl. 154—28)

This invention relates to an essentially, automatically fabricated insulating product.

This application discloses certain of the subject matter and constitutes a continuation-in-part of Powell Patent No. 1,948,395, filed January 16, 1928, said patent, in turn, being a division of Powell Patent No. 1,656,828, filed January 5, 1927.

The chief object of this invention is to manufacture a felted fabric by an automatic process and, through the use of a suitable binder material for causing adhesion of the fiber material, form a product that can be readily handled in block or sheet form, as desired.

One of the chief features of the invention is the automatic production of a flexible, waterproof felt.

Another feature of the invention is the production of a relatively rigid waterproof felt, the degree of flexibility or rigidity being determined by the character of the binder employed and the method of treating the same.

Another feature of the invention consists in the formation of a felted strip or sheet suitable for coating on one or both sides and suitable for subsequent assembly into a laminated structure.

Figure 1:
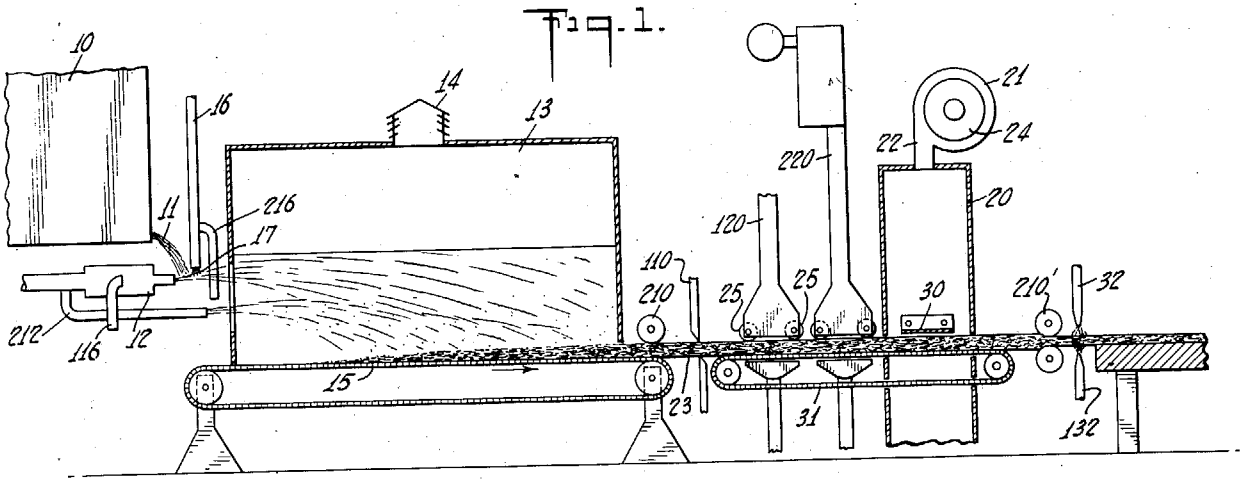
Figure 3:
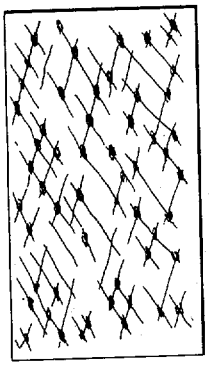
Figure 2:
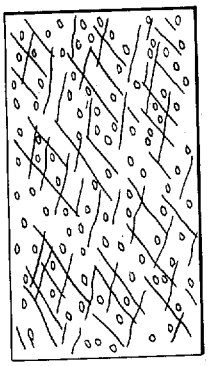
Figure 4:
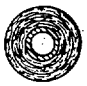

The full nature of the invention will be understood from the accompanying drawing and the following description and claims:

In the drawing, Fig. 1 is a diagrammatic side elevation of an apparatus suitable for performing the process and producing the products. Fig. 2 is an enlarged plan view of a portion of the material produced by the first step of the process. Fig. 3 is a similar view of the material when completed. Fig. 4 is a side elevation of material in pipe covering formation.

In the drawing, 10 indicates a furnace having a molten stream discharge 11 which is of a character to produce a fiber such as commonly known as mineral wool. This fiber is produced by a steam-blowing nozzle 12 discharging the fiber and steam as well as air into a conveyor-type blow chamber 13, which vents the steam and air as at 14 and deposits the fiber on an endless conveyor 15.

There is incorporated in the fiber a suitable binder and one way of supplying this binder is to apply it in liquid form in a stream just beyond the stream of molten rock. A supply pipe 16 has a discharge portion as indicated, and the binder is shown dropping therefrom as at 17. The steam jet carries both the liquids, that is, the molten rock 11 and the binder 17, and diffuses them together thereby forming a suspension of the mineral fibers admixed with the finely divided binding material in the gaseous atmosphere of the settling chamber. With this form of introduction and diffusion, a considerable part of the binder is present as droplets in the fiber mass when the successive increments thereof are deposited upon the belt, see Fig. 2, and has relatively little fiber binding effect. A suitable binder is sodium silicate. Other binders that can be applied in this manner are linseed oil, waxes and asphaltic fluxes.

The invention contemplates intimately mixing a binder with fiber of mineral character and thereafter subjecting the fiber and binder to treatment to disperse the droplets or change the composition thereof, or both, and, when dispersed and/or changed, to harden the binder to obtain the binding action not obtainable by mere mixing.

The process contemplates hardening the binder (the binder specified being initially of a fluid to a semi-fluid consistency) without changing the composition of it, or hardening the binder by changing the composition, or hardening the binder by the addition of other materials added to it, such as passing suitable reacting gases or vapors through the binder and fibrous material to form the sheet or product having the desired stiffness, rigidity or toughness.

If linseed oil is the binder, hot air blown through the fiber mass will first oxidize the oil, which dries and hardens in binding relation to the fibers. No further baking need then be employed, although it may be employed if desired.

Silicate of soda hardens by evaporation, which may be hastened by the use of hot air.

Asphaltic fluxes harden by evaporation of the volatile content and by oxidation or reaction with air and are waterproofing in character.

The binder may be a mixture of the foregoing ingredients or other ingredients, if desired or preferred.

It will be noted, therefore, that all of these binders harden by the use of heat in the presence of air and also with the use of other suitable gases and vapors, which may be especially adapted to react with the binder chosen.

The binder, preferably, should be applied in the form of a thin liquid, that is, one of low viscosity, but the binder should have the property of being easily hardened or toughened.

If the droplets shown in Fig. 2 consist of asphaltic fluxes or wax, the passing of hot air through the sheet in the continuous oven, as the sheet passes through the oven, will first melt the wax or asphaltic fluxes and disperse the same throughout the mass of fiber and tend to collect it along the junctions of the matted fibers as shown in Fig. 3. Continued application of heat drives off volatiles in the asphaltic fluxes or wax and permits the same to stiffen the sheet upon cooling.

Figs. 2 and 3 are greatly magnified and represent more or less ideal conditions for illustrating and explaining this invention. Fig. 2 illustrates the uniform manner in which the binding material is disseminated through the fibers of the matted material. However, it is the intention to describe a process in which these effects may take place to a much less extent than the idealized condition shown and yet be important enough to change the physical characteristics of the block.

The petroleum wax, silicate of soda, or linseed oil, or a mixture thereof, may be supplied by the pipes 16, 116, or 216. In the first case, the binder is broken up into finely divided form and admixed with the fibres in the settling chamber by the steam jet issuing from nozzle 12, as previously referred to, and in the second case, the binder supplied by pipe 116 is carried into the steam stream in nozzle 12 and broken up or dispersed thereby and issues with the steam from the nozzle. Where the binder supply 216 is employed, a separate steam nozzle 212 is used, serving to disperse the binder similarly as in the case of the binder supply 16 and nozzle 12. The felted strip upon said conveyor passes under the felting roll 210 for compacting the felt and thence, if blocks are to be formed, through a suitable block-forming device such as the shears 110.

Strip 23, or the blocks then may be subjected to steam or other fluid in the hood 120, the blocks or strip being carried through the hood construction by conveyor 31 which preferably is perforated for the passage of steam through said conveyor and the blocks or strip 23. The space between the strip and hood at the entrance and exit ends of the hood is sealed by the rollers 25.

Another hood 220 is provided, also similarly sealed and associated with the perforated conveyor 31, the hood being adapted to supply hot air for passage through the block.

Another hood construction 20 having the blower connection 22, blower 21 and motor 24 is adapted to secure the passage of air through the conveyor and also through the strip or blocks 23. The hood includes a baffle 30 for securing circuitous passage of the gas in the hood and, therefore, intimate contact with and penetration of the block. After the material in the block has been pressed or heat treated, it passes between the rolls 210' and, if desired, binder coating jets 32 or 132, or both, may be employed for coating one or both sides of the strip 23 to form a coated, as well as felted, air-tight block, and such a coated felted strip is suited as such to form a laminated product.

As previously suggested, the invention contemplates, if and when desired, the change of the shape of the block or unit by compressing or otherwise mechanically deforming prior to hardening, toughening and binding of the unit together by heating or oxidizing, etc.

Compressing the felt as by rolls 210 has the advantage of bringing the fibers into more intimate contact with the binding ingredient, e. g., the asphalt. Preferably, any appreciable compression should be applied to the felt before the binder hardens.

This invention, therefore, contemplates the employment of a binder of the character set forth constituting any one of the ingredients or a mixture thereof and subjecting the felt to any one or all of the gas treatments disclosed with reference to hoods or chambers 20, 120 and 220. The invention includes the formation of a mineral fiber sheet, block or roll by what is commonly known as a relatively cold process. While this may seem a misnomer, since hot air or steam or other hot gases may be employed, it, nevertheless, is called and known as a cold process, for the present invention contemplates subjecting the material to only a temperature of from two hundred to two hundred and fifty degrees to form a more flexible material and from three hundred to three hundred and fifty degrees to form a stiffer felt. The probable percentage of organic material for the product is between twenty and thirty per cent.

What I claim is:

1. In a process for the manufacture of matted material containing mineral fibers and a binder, the improvement which consists in melting a mineral material, disintegrating the melted material and projecting the same into a chamber at high velocity to form fibers, treating the fibers while hot with a hardenable binding material, collecting said fibres on a moving support to form a mat of suitable thickness, and subjecting the matted material to the action of heat and a fluid medium treatment to stiffen and harden the binder.

2. In a process for the manufacture of matted material containing mineral fibers and a binder, the improvement which consists in melting a mineral material, disintegrating the melted material and projecting the same into a chamber at high velocity to form fibers, treating the fibers while hot with a hardenable binding material, collecting said fibres on a moving support to form a mat of suitable thickness, and subjecting the matted material to steam and air treatment to stiffen and harden the binder.

3. In a process for the manufacture of a sheet material containing mineral fibers and a binder, the improvement which consists in forming a suspension of fibers by disintegrating a molten stream of a suitable mineral material, introducing a binding material including a water-mixed binder and a hydrocarbon into the suspension of fibers with the binder in finely divided form therein, depositing the suspended admixture in successive increments on a moving support until a layer or mat of suitable thickness is formed, subjecting the matted material to treatment for removing the water, and compacting the mat.

4. In a process for the manufacture of matted material containing mineral fibers and a binder, the improvement which consists in melting a mineral material, disintegrating the melted mineral material and projecting the same into a chamber at high velocity, projecting a thermoplastic binder in finely divided condition into said chamber, collecting said fibers and the interspersed binder on a moving support to form a mat of suitable thickness, advancing the matted material from said chamber, and subjecting it while being advanced to the action of a gaseous medium to cool and harden the binder.

5. A process for the manufacture of felted material, which comprises forming a suspension of mineral wool fibres by disintegrating a molten stream of a suitable mineral material, introducing an organic, heat-hardening binder material into the suspension of fibres with the binder in finely divided form therein, depositing the suspended admixture on a moving support to form a felted mat of suitable thickness, compacting the mat, conveying the felted mat to a heat-treating zone, and passing a heated gas through said mat within said zone to harden the binder.

6. A process for the manufacture of felted material, which comprises forming a suspension of mineral wool fibres by disintegrating a molten stream of a suitable mineral material, introducing a binder including heat-hardening material into the suspension of fibres with the binder in finely divided form therein, depositing the suspended admixture on a moving support to form a felted mat of suitable thickness, compacting the mat, conveying the mat on an air-pervious conveyor through a heat-treating chamber, and passing a gas through said conveyor and mat within said chamber to heat and harden said heat-hardening material.

7. A process for the manufacture of felted material, which comprises forming a suspension of mineral wool fibres by disintegrating a molten stream of a suitable mineral material, introducing a binder of a character to become set and hardened when subjected to a current of gas into the suspension of fibres with the binder in finely divided form, depositing the suspended admixture on a moving support to form a felted mat of suitable thickness, compacting the mat, carrying the mat on an air-pervious conveyor through a treating chamber, and passing a gas through said conveyor and mat while in said chamber to set said binder.

8. A process for the manufacture of felted material, which comprises forming a suspension of mineral wool fibres by disintegrating a molten stream of a suitable mineral material, introducing a binder including a heat-hardening material into the suspension of fibres with the binder in finely divided form therein, depositing the suspended admixture on a moving support to form a felted mat of suitable thickness, compacting the mat, conveying the felted mat to a heat-treating zone, passing a gas through said mat in said zone to heat and harden the binder, removing the mat from said zone, and cooling the mat.

9. A process for the manufacture of felted material, which comprises forming a suspension of mineral wool fibres by disintegrating a molten stream of a suitable mineral material, introducing a binder including a heat-hardening material and a bituminous material into the suspension of fibres with the binder in finely divided form therein, depositing the suspended admixture on a moving support to form a felted mat of suitable thickness, compacting the mat, conveying the felted mat to a heat-treating zone, passing a gas through said mat in said zone to heat and harden said heat-hardening material, and cooling said mat.

10. A process for the manufacture of felted material, which comprises forming a suspension of mineral wool fibres by disintegrating a molten stream of a suitable mineral material, introducing a binder including a heat-hardening material and a bituminous material into the suspension of fibres with the binder in finely divided form therein, depositing the suspended admixture on a moving support to form a felt of suitable thickness with the binder substantially uniformly disseminated therethrough, compacting the felt, carrying the felt on an air-pervious conveyor through a heat-treating chamber, passing a heated gas through said conveyor and felt within said chamber to harden said heat-hardening material, and cooling the felt.

11. A process for the manufacture of felted material, which comprises forming a suspension of mineral wool fibres by disintegrating a molten stream of a suitable mineral material, introducing a binder including a drying oil into the suspension of fibres with the binder in finely divided form therein, depositing the suspended admixture on a moving support to form a felted mat of suitable thickness with the binder substantially uniformly disseminated therethrough, compacting the mat, and passing an oxidizing gas through said mat to oxidize and set said drying oil.

12. A process for the manufacture of felted material, which comprises forming a suspension of mineral wool fibres by disintegrating a molten stream of a suitable mineral material, introducing a binder including a drying oil into the suspension of fibres with the binder in finely divided form therein, depositing the suspended admixture on a moving support to form a felted mat of suitable thickness, compacting the mat, conveying the mat to a heat-treating chamber, and passing an oxidizing gas through said mat within said chamber to oxidize and set said drying oil.

13. A process for the manufacture of felted material, which comprises forming a suspension of mineral wool fibres by disintegrating a molten stream of a suitable mineral material, introducing a binder including a drying oil into the suspension of fibres with the binder in finely divided form therein, depositing the suspended admixture on a moving support to form a felted mat of suitable thickness with the binder substantially uniformly disseminated throughout said mat, compacting the mat, carrying the mat on an air-pervious conveyor through a heat-treating chamber, and passing a heated oxidizing gas through said conveyor and mat within said chamber to oxidize and set said drying oil.

14. A process for the manufacture of felted material, which comprises forming a suspension of mineral wool fibres by disintegrating a molten stream of a suitable mineral material, introducing a binder including linseed oil into the suspension of fibres with the binder in finely divided form therein, depositing the suspended admixture on a moving support to form a felted mass of suitable thickness with the binder substantially uniformly disseminated throughout the mat, compacting the mat, and passing a heated oxidizing gas through the mat to set said linseed oil.

15. A process for the manufacture of felted material, which comprises forming a suspension of mineral wool fibres by disintegrating a molten stream of a suitable mineral material, introducing a hardenable binder into the suspension of fibres with the binder in finely divided form therein, depositing the suspended admixture on a moving support to form a felted layer of suitable thickness, compacting and distorting the layer to alter its shape, and hardening the binder.

EDWARD R. POWELL.